US011424870B2

(12) United States Patent
Jauh et al.

(10) Patent No.: US 11,424,870 B2
(45) Date of Patent: Aug. 23, 2022

(54) DATA FRAME RETRANSMISSION METHOD AND DEVICE

(71) Applicant: SPREADTRUM COMMUNICATIONS (SHANGHAI) CO., LTD., Shanghai (CN)

(72) Inventors: Yuhren Jauh, Shanghai (CN); Chinghwa Yu, Shanghai (CN); Yanchao Xu, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/955,817

(22) PCT Filed: Mar. 12, 2020

(86) PCT No.: PCT/CN2020/078912
§ 371 (c)(1),
(2) Date: Jun. 19, 2020

(87) PCT Pub. No.: WO2020/207180
PCT Pub. Date: Oct. 15, 2020

(65) Prior Publication Data
US 2021/0234641 A1 Jul. 29, 2021

(30) Foreign Application Priority Data
Apr. 12, 2019 (CN) .......................... 201910297051.8

(51) Int. Cl.
*H04L 1/18* (2006.01)
*H04L 1/00* (2006.01)
*H04L 1/16* (2006.01)

(52) U.S. Cl.
CPC .......... *H04L 1/1841* (2013.01); *H04L 1/0002* (2013.01); *H04L 1/1607* (2013.01)

(58) Field of Classification Search
None
See application file for complete search history.

(56) References Cited

U.S. PATENT DOCUMENTS

| 9,413,643 B2 | 8/2016 | Hui et al. | |
| 2005/0288053 A1* | 12/2005 | Gu | ........................ H04W 52/12 |
| | | | 455/522 |

(Continued)

FOREIGN PATENT DOCUMENTS

| CN | 1852581 A | 10/2006 |
| CN | 101136849 A | 3/2008 |

(Continued)

OTHER PUBLICATIONS

CNIPA First Office Action for corresponding CN Application No. 201910297051.8; dated Mar. 16, 2021.

(Continued)

*Primary Examiner* — Mujtaba M Chaudry
(74) *Attorney, Agent, or Firm* — Cantor Colburn LLP

(57) ABSTRACT

Data frame retransmission method and device are provided. The method is applied in a multi-link Wi-Fi system including multiple links each of which includes a queuing list for determining a transmission order of data frames in the link, and the method includes: when a first link obtains a transmission opportunity, transmitting, on the first link, a first data frame at a head of the queuing list of the first link; if transmission of the first data frame does not succeed, restoring ranking of the first data frame in queuing lists of links in a retransmission link set, or arranging the first data frame at heads of the queuing lists of the links; and when any link in the retransmission link set obtains a new transmission (Continued)

opportunity and the first data frame is at a head of a queuing list of the link, retransmitting the first data frame on the link.

19 Claims, 9 Drawing Sheets

(56) References Cited

U.S. PATENT DOCUMENTS

| | | | | |
|---|---|---|---|---|
| 2006/0187955 A1* | 8/2006 | Rezaiifar | ............... | H04L 1/1642 370/464 |
| 2007/0041385 A1 | 2/2007 | Sali et al. | | |
| 2008/0049620 A1* | 2/2008 | Riga | ................... | H04W 56/004 370/236 |
| 2008/0285537 A1* | 11/2008 | Medapalli | ............. | H04L 5/0023 370/349 |
| 2012/0057451 A1* | 3/2012 | Kim | ...................... | H04L 1/1887 370/216 |
| 2013/0094349 A1* | 4/2013 | Hoshino | ........... | H04L 25/03942 370/216 |
| 2017/0331577 A1* | 11/2017 | Parkvall | ............... | H04B 7/0848 |
| 2020/0008254 A1* | 1/2020 | Beck | ........................ | H04W 4/80 |
| 2020/0382243 A1 | 12/2020 | Li et al. | | |

FOREIGN PATENT DOCUMENTS

| | | |
|---|---|---|
| CN | 101651963 A | 2/2010 |
| CN | 101938341 A | 1/2011 |
| CN | 105490782 A | 4/2016 |
| CN | 105897579 A | 8/2016 |
| CN | 106550470 A | 3/2017 |
| CN | 107846369 A | 3/2018 |
| CN | 108631961 A | 10/2018 |
| CN | 109587052 A | 4/2019 |
| WO | 2007022441 A1 | 2/2007 |

OTHER PUBLICATIONS

International Search Report and Written Opinion of the International Search Authority for International Application No. PCT/CN2020/078912; dated Jun. 10, 2020.

* cited by examiner

DATA FRAME RETRANSMISSION METHOD AND DEVICE

CROSS-REFERENCE TO RELATED APPLICATIONS

This is the U.S. national stage of application No. PCT/CN2020/078912, filed on Mar. 12, 2020. Priority under 35 U.S.C. § 119(a) and 35 U.S.C. § 365(b) is claimed from Chinese Application No. 201910297051.8, filed on Apr. 12, 2019, the entire disclosure of which is also incorporated herein by reference.

TECHNICAL FIELD

The present disclosure generally relates to communication field, and more particularly, to a data frame retransmission method and device.

BACKGROUND

In a conventional Wireless Fidelity (Wi-Fi) system, there is merely one Media Access Control (MAC) layer and one physical layer. Therefore, data frames are transmitted merely on a single link in the Wi-Fi system. When a transmission failure occurs, data frames are retransmitted according to an existing retransmission mechanism. Due to the retransmission mechanism, a transmission rate of a data frame at the physical layer may gradually decrease.

At present, there are some solutions for multi-link Wi-Fi systems. However, for multi-link Wi-Fi systems, a new data frame retransmission method and device are still needed.

SUMMARY

In an embodiment of the present disclosure, a data frame retransmission method is provided, wherein the method is applied in a multi-link Wi-Fi system which includes a plurality of links, each of the plurality of links includes a queuing list for determining a transmission order of data frames in the link, and the method includes: when a first link obtains a transmission opportunity, transmitting, on the first link, a first data frame at a head of the queuing list of the first link; if transmission of the first data frame does not succeed, ranking the first data frame at the head of the queuing list of the first link; and when the first link obtains a new transmission opportunity, retransmitting the first data frame on the first link.

Optionally, a transmission rate in retransmission is not higher than a transmission rate in a previous transmission.

Optionally, after N times of failures in retransmission of the first data frame, the transmission of the first data frame is abandoned, where N is a positive integer.

Optionally, the method further includes: after the first data frame starts to be transmitted, removing the first data frame from at least one queuing list of at least one link other than the first link, wherein the plurality of links include the first link and the at least one link.

In an embodiment of the present disclosure, a data frame retransmission method is provided, wherein the method is applied in a multi-link Wi-Fi system which includes a plurality of links, each of the plurality of links includes a queuing list for determining a transmission order of data frames in the link, and the method includes: when a first link obtains a transmission opportunity, transmitting, on the first link, a first data frame at a head of the queuing list of the first link; if transmission of the first data frame does not succeed, ranking the first data frame at the head of the queuing list of the first link, and if a predetermined condition is further met, duplicating the first data frame to at least one other link in a retransmission link set, and ranking the first data frame at at least one head of at least one queuing list of the at least one other link; and if any link in the retransmission link set obtains a new transmission opportunity, retransmitting the first data frame on the link, wherein the retransmission link set includes the first link and at least one link other than the first link, or includes the first link and a portion of the at least one link other than the first link, and the predetermined condition is that accelerated processing by the system is required.

Optionally, the predetermined condition is related to a retransmission duration of the first data frame or window occupancy of a buffer.

Optionally, for each of the links in the retransmission link set, a transmission rate in retransmission is not higher than a transmission rate in a previous transmission.

Optionally, a rate adjustment mechanism during a data frame retransmission process is independent for each ink.

Optionally, after N times of failures in retransmission of the first data frame, the transmission of the first data frame is abandoned, where N is a positive integer.

Optionally, the method further includes: if the predetermined condition is not met, after the first data frame starts to be transmitted, removing the first data frame from at least one queuing list of at least one link other than the link on which the first data frame is being transmitted.

Optionally, the method further includes: if the predetermined condition is met, after the first data frame starts to be transmitted, the first data frame entering a masked state in at least one queuing list of at least one link other than the link on which the first data frame is being transmitted.

Optionally, the method further includes: if the predetermined condition is met, after the first data frame starts to be transmitted, the first data frame entering a wait state in at least one queuing list of at least one link other than the link on which the first data frame is being transmitted.

Optionally, the method further includes: if the predetermined condition is met, after transmission of the first data frame is completed, removing the first data frame from at least one queuing list of at least one link other than the link on which the first data frame is being transmitted.

In an embodiment of the present disclosure, a data frame retransmission method is provided, wherein the method is applied in a multi-link Wi-Fi system which includes a plurality of links, each of the plurality of links includes a queuing list for determining a transmission order of data frames in the link, and the method includes: when a first link obtains a transmission opportunity, transmitting, on the first link, a first data frame at a head of the queuing list of the first link; if transmission of the first data frame does not succeed, restoring ranking of the first data frame in queuing lists of links in a retransmission link set, or arranging the first data frame at heads of the queuing lists of the links in the retransmission link set; and when any link in the retransmission link set obtains a new transmission opportunity and the first data frame is at a head of a queuing list of the link, retransmitting the first data frame on the link, wherein the retransmission link set includes the first link and at least one link other than the first link, or includes the first link and a portion of the at least one link other than the first link.

Optionally, for each of the links in the retransmission link set, a transmission rate in retransmission is not higher than a transmission rate in a previous transmission.

Optionally, a rate adjustment mechanism during a data frame retransmission process is independent for each ink.

Optionally, after N times of failures in retransmission of the first data frame, the transmission of the first data frame is abandoned, where N is a positive integer.

Optionally, the method further includes: after the first data frame starts to be transmitted, the first data frame entering a masked state in at least one queuing list of at least one link other than the link on which the first data frame is being transmitted.

Optionally, the method further includes: after transmission of the first data frame is completed, removing the first data frame from at least one queuing list of at least one link other than the link on which the first data frame is being transmitted.

In an embodiment of the present disclosure, a data frame retransmission device including a memory and a processor is provided, wherein the memory has a computer program stored therein, and when the processor executes the computer program, the above data frame retransmission method is performed, wherein the data frame retransmission method includes: when a first link obtains a transmission opportunity, transmitting, on the first link, a first data frame at a head of the queuing list of the first link; if transmission of the first data frame does not succeed, ranking the first data frame at the head of the queuing list of the first link; and when the first link obtains a new transmission opportunity, retransmitting the first data frame on the first link.

In an embodiment of the present disclosure, a data frame retransmission device including a memory and a processor is provided, wherein the memory has a computer program stored therein, and when the processor executes the computer program, the above data frame retransmission method is performed, wherein the data frame retransmission method includes: when a first link obtains a transmission opportunity, transmitting, on the first link, a first data frame at a head of the queuing list of the first link; if transmission of the first data frame does not succeed, ranking the first data frame at the head of the queuing list of the first link, and if a predetermined condition is further met, duplicating the first data frame to at least one other link in a retransmission link set, and ranking the first data frame at at least one head of at least one queuing list of the at least one other link; and if any link in the retransmission link set obtains a new transmission opportunity, retransmitting the first data frame on the link.

In an embodiment of the present disclosure, a data frame retransmission device including a memory and a processor is provided, wherein the memory has a computer program stored therein, and when the processor executes the computer program, the above data frame retransmission method is performed, wherein the data frame retransmission method includes: when a first link obtains a transmission opportunity, transmitting, on the first link, a first data frame at a head of the queuing list of the first link; if transmission of the first data frame does not succeed, restoring ranking of the first data frame in queuing lists of links in a retransmission link set, or arranging the first data frame at heads of the queuing lists of the links in the retransmission link set; and when any link in the retransmission link set obtains a new transmission opportunity and the first data frame is at a head of a queuing list of the link, retransmitting the first data frame on the link.

Embodiments of the present disclosure may provide following advantages.

In embodiments of the present disclosure, a data frame retransmission method includes: when a first link obtains a transmission opportunity, transmitting, on the first link, a first data frame at a head of the queuing list of the first link; if transmission of the first data frame does not succeed, ranking the first data frame at the head of the queuing list of the first link; and when the first link obtains a new transmission opportunity, retransmitting the first data frame on the first link. In the embodiments, the retransmission is restricted on an original link, which reduces complexity of design of a multi-link Wi-Fi system and a data frame retransmission mechanism.

In embodiments of the present disclosure, a data frame retransmission method includes: when a first link obtains a transmission opportunity, transmitting, on the first link, a first data frame at a head of the queuing list of the first link; if transmission of the first data frame does not succeed, ranking the first data frame at the head of the queuing list of the first link, and if a predetermined condition is further met, duplicating the first data frame to at least one other link in a retransmission link set, and ranking the first data frame at at least one head of at least one queuing list of the at least one other link; and if any link in the retransmission link set obtains a new transmission opportunity, retransmitting the first data frame on the link. In the embodiments, data frame duplication is combined with single link retransmission, which improves a data frame retransmission rate.

In embodiments of the present disclosure, a data frame retransmission method includes: when a first link obtains a transmission opportunity, transmitting, on the first link, a first data frame at a head of the queuing list of the first link; if transmission of the first data frame does not succeed, restoring ranking of the first data frame in queuing lists of links in a retransmission link set, or arranging the first data frame at heads of the queuing lists of the links in the retransmission link set; and when any link in the retransmission link set obtains a new transmission opportunity and the first data frame is at a head of a queuing list of the link, retransmitting the first data frame on the link. In the embodiments, the data frame can be retransmitted on multiple links, which may reduce latency and buffer overflow in a Wi-Fi system.

DETAILED DESCRIPTION

Figure 1:
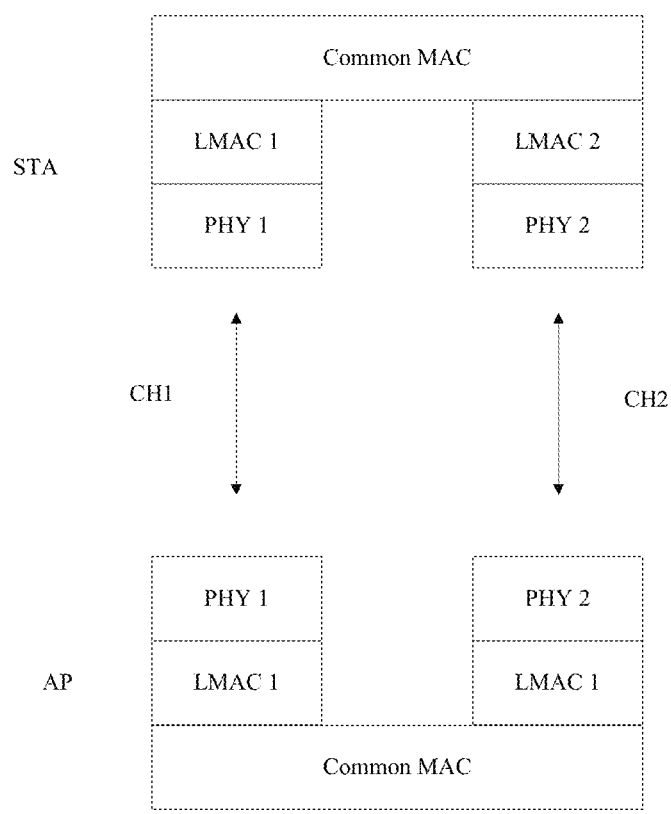
FIG. 1 is a diagram of a multi-link Wi-Fi system according to an embodiment.

Referring to FIG. 1, FIG. 1 is a Diagram of a Multi-Link Wi-Fi System According to an Embodiment.

The multi-link Wi-Fi system may include a Station (STA), an Access Point (AP), and multiple links. Data frames are transmitted on the multiple links between the STA and the AP. In the embodiment as shown in FIG. 1, the multi-link Wi-Fi system includes a first link CH1 and a second link CH2.

In some embodiments, the first link CH1 and the second link CH2 may occupy different frequency band resources to implement data transmission. For example, the first link CH1 may occupy a frequency band with a center frequency of 2 GHz, and the second link CH2 may occupy a frequency band with a center frequency of 5 GHz. In some embodiments, the first link CH1 and the second link CH2 may occupy a same frequency band to implement data transmission. In some embodiments, the frequency band shared by the two links may be relatively wide so as to be used for simultaneous data transmission on the two links, or may be used by the two links for data transmission via time division multiplexing.

In the embodiment as shown in FIG. 1, at the STA, data frames to be transmitted may be arranged into a queuing list of the first link CH1 and a queuing list of the second link CH2, respectively. In some embodiments, the data frames to be transmitted can be arranged into queuing lists of different links in the form of indexes.

In the embodiment as shown in FIG. 1, at either the STA or the AP, a network layer includes a MAC layer (Common MAC), and below the MAC layer there are a first sub MAC layer LMAC1, a second sub MAC layer LMAC2, a first physical layer PHY1 and a second physical layer PHY2. Specifically, the first sub MAC layer LMAC1 and the first physical layer PHY1 are configured to enable the STA or the AP to transmit data on the first link CH1, and the second sub MAC layer LMAC2 and the second physical layer PHY2 are configured to enable the STA or the AP to transmit data on the second link CH2. In some embodiments, the multi-link Wi-Fi system include multiple links, thus, the multi-link Wi-Fi system may include multiple sub MAC layers and multiple corresponding physical layers.

Figure 2:
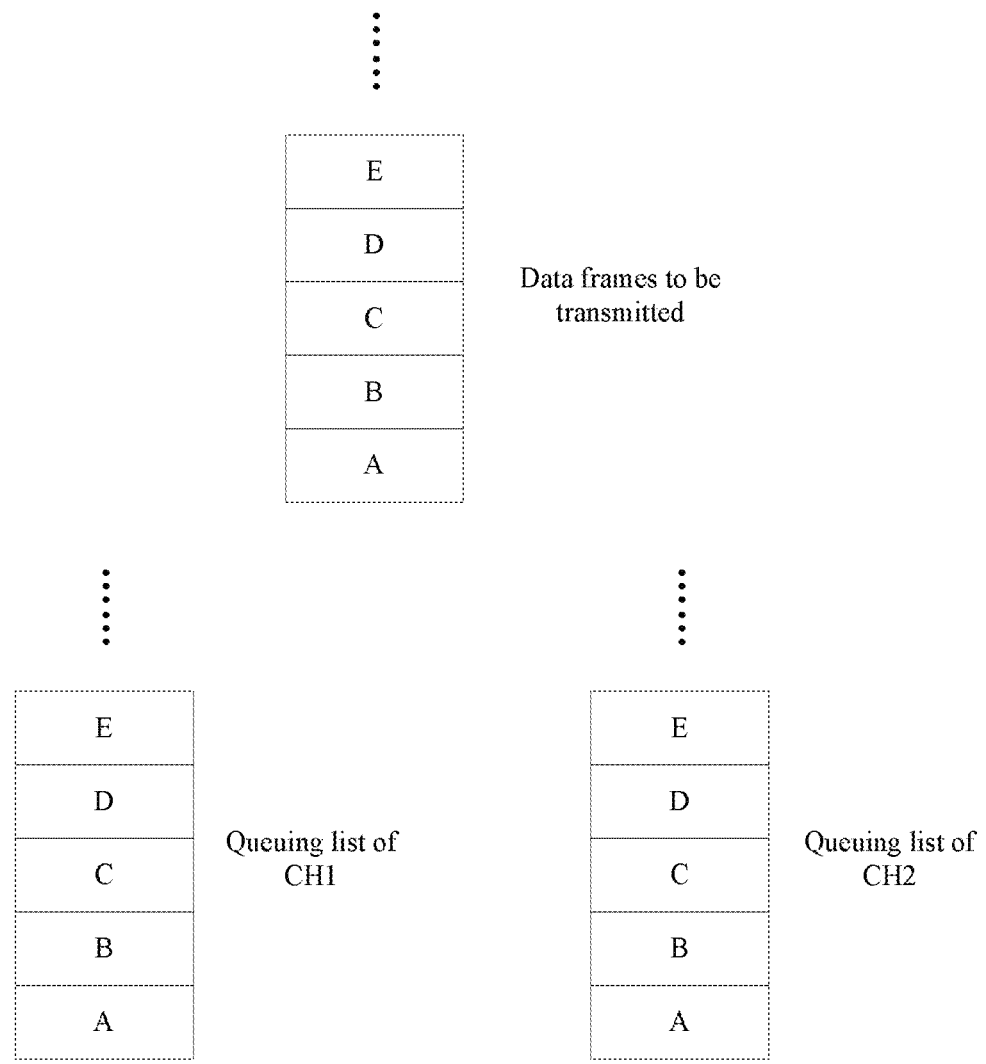
FIG. 2 is a diagram of queuing lists when data transmission is performed in the multi-link Wi-Fi system as shown in FIG. 1.

Referring to FIG. 2, FIG. 2 is a diagram of queuing lists when data transmission is performed in the multi-link Wi-Fi system as shown in FIG. 1. The data frames to be transmitted include a data frame A, a data frame B, a data frame C, a data frame D and a data frame E. In an existing multi-link Wi-Fi system, the data frames to be transmitted are arranged in a queuing list of each link, and may be transmitted on any link.

Figure 3:
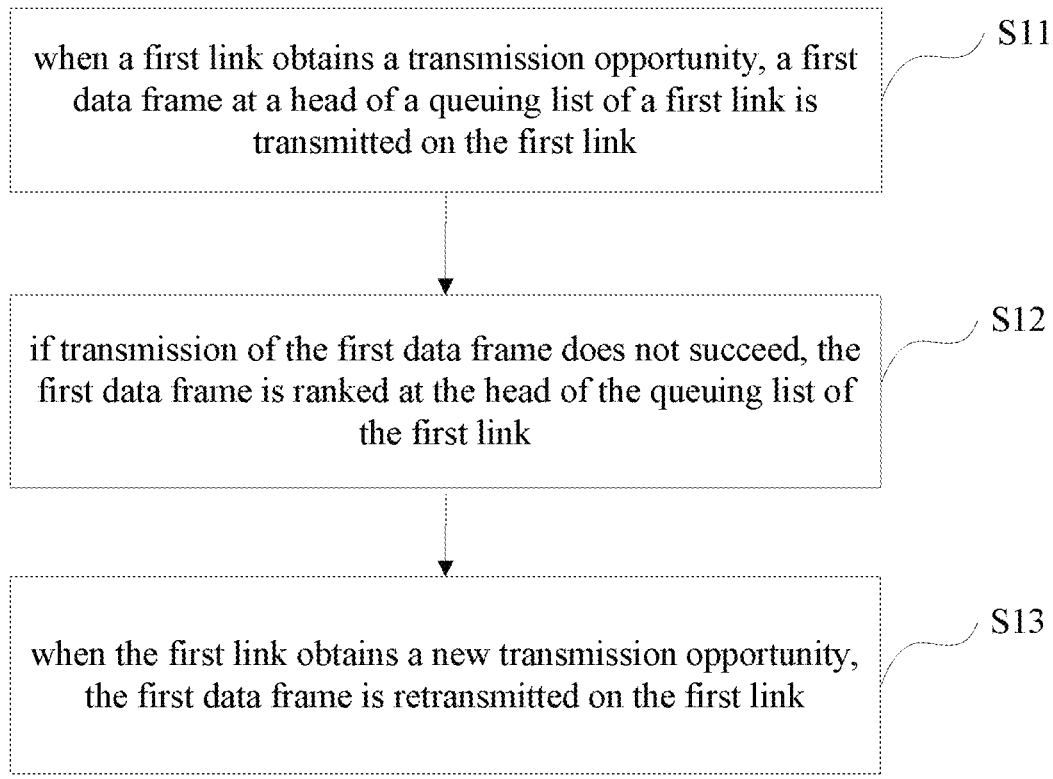
FIG. 3 is a flow chart of a data frame retransmission method according to an embodiment.
Figure 4:
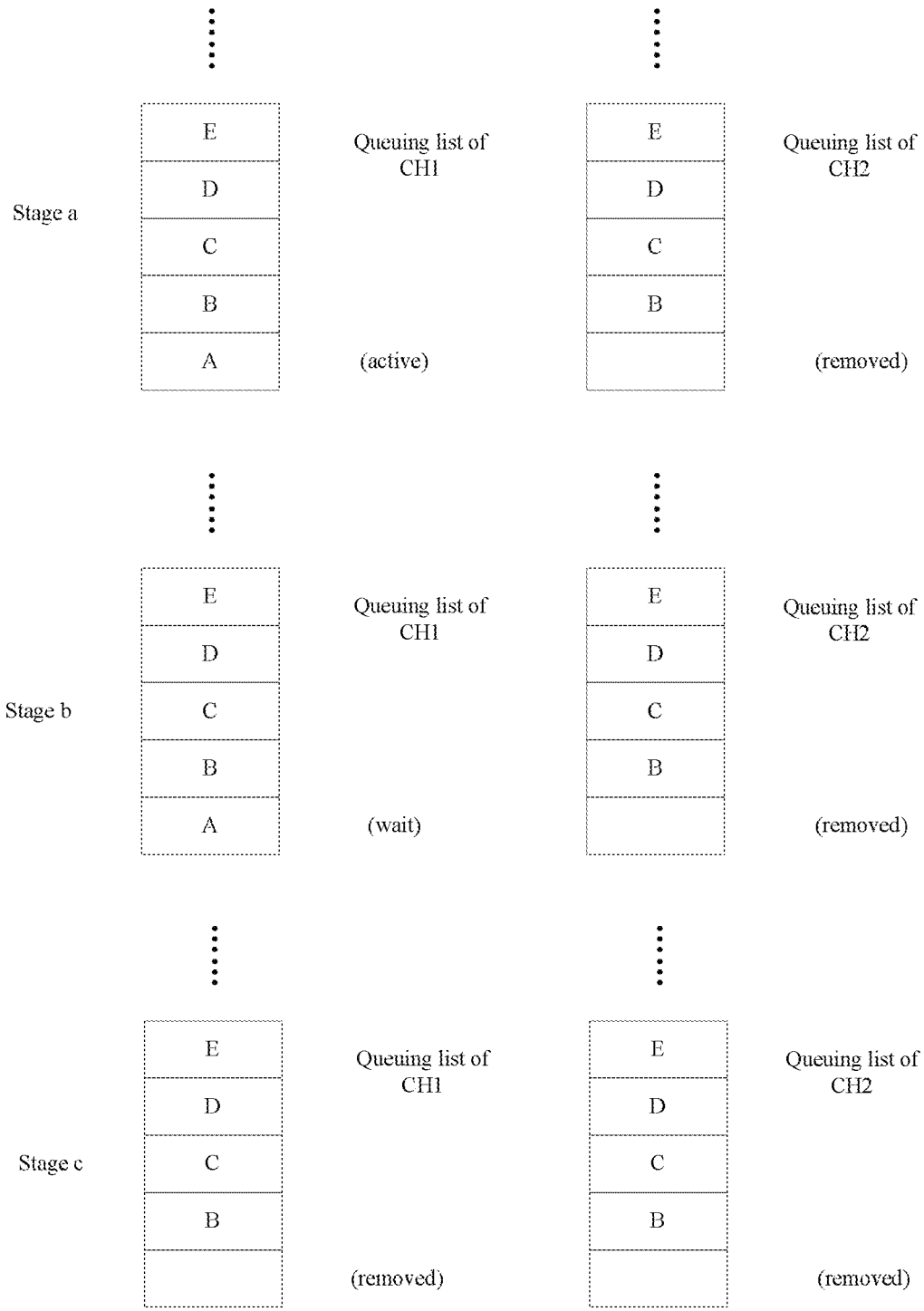
FIG. 4 is a diagram of queuing lists in the method as shown in FIG. 3.

Referring to FIG. 3 and FIG. 4, FIG. 3 is a flow chart of a data frame retransmission method according to an embodiment, and FIG. 4 is a diagram of queuing lists in the method as shown in FIG. 3. In the embodiment as shown in FIG. 3 and FIG. 4, the multi-link Wi-Fi system includes a first link and a second link, and FIG. 4 illustrates the queuing lists of the first link CH1 and the second link CH2.

In S11, when a first link obtains a transmission opportunity, a first data frame at a head of a queuing list of a first link is transmitted on the first link.

As shown in FIG. 4, at stage a, when the first link obtains a transmission opportunity, the STA or the AP transmits the first data frame at the head of the queuing list, i.e., the data frame A, on the first link. In some embodiments, after the first link obtains the transmission opportunity, the data frame A in the queuing list of the first link enters an active state and starts to be transmitted.

In some embodiments, the data frame retransmission method further includes: after the first data frame starts to be transmitted, removing the first data frame from at least one queuing list of at least one link other than the first link, wherein the plurality of links include the first link and the at least one link. Therefore, in the embodiment as shown in FIG. 4, after the data frame A in the queuing list of the first link enters the active state, the data frame A is removed from the queuing list of the second link.

It should be noted that when the second link obtains a transmission opportunity, the STA or the AP transmits on the second link a data frame at a head of the queuing list of the second link. Specifically, after the data frame A starts to be transmitted, if the second link obtains a transmission opportunity, the data frame B is transmitted on the second link.

In S12, if transmission of the first data frame does not succeed, the first data frame is ranked at the head of the queuing list of the first link.

As shown in FIG. 4, at stage b, if transmission of the data frame A does not succeed, the data frame A is ranked at the head of the queuing list of the first link.

In some embodiments, the data frame A is originally transmitted on the first link but the transmission does not succeed, then the data frame A becomes a wait state and is still at the head of the queuing list of the first link.

In S13, when the first link obtains a new transmission opportunity, the first data frame is retransmitted on the first link.

In some embodiments, when the first link obtains a new transmission opportunity, the data frame A enters the active state again, and starts to be transmitted on the first link.

As shown in FIG. 4, at stage c, the first link completes the transmission of the data frame A, and the data frame A is removed from the queuing list of the first link.

In some embodiments, when the first data frame is retransmitted, a transmission rate is not higher than a previous transmission rate. In some embodiments, the transmission rate of the data frame in retransmission may decrease linearly or stepwise. The transmission rate is not limited in embodiments of the present disclosure.

In some embodiments, for each link, a rate adjustment mechanism during the data frame retransmission is independent. Specifically, in the embodiment as shown in FIG. 4, the first link and the second link may have different rate adjustment mechanisms, thereby increasing flexibility of the system.

In some embodiments, after N times of failures in retransmission of the first data frame, the transmission of the first data frame is abandoned, where N is a positive integer. In some embodiments, N may be 10. Specifically, in the embodiment as shown in FIG. 4, after N times of failures in retransmission of the data frame A, the transmission of the data frame A is abandoned. Before retransmission of the data frame A is completed or the transmission of the data frame A is abandoned, no other data frames are transmitted on the first link.

In the above embodiments, the retransmission of data frames is restricted to the original link, which reduces complexity of design of the multi-link Wi-Fi system and the data frame retransmission mechanism.

Figure 5:
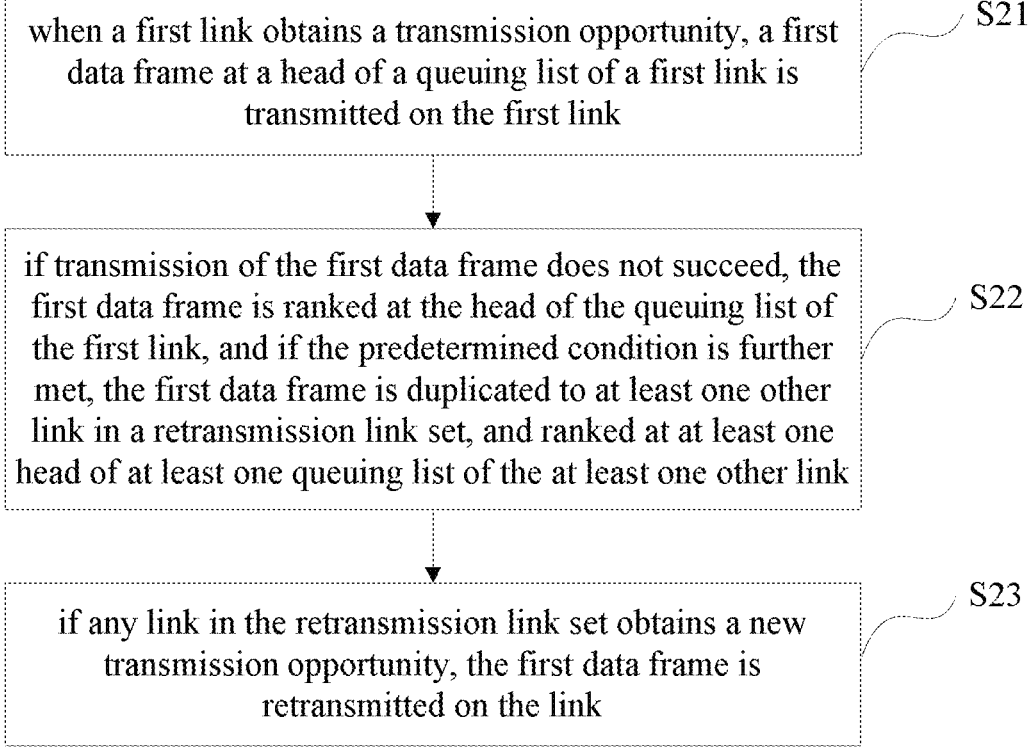
FIG. 5 is a flow chart of a data frame retransmission method according to an embodiment.
Figure 6:
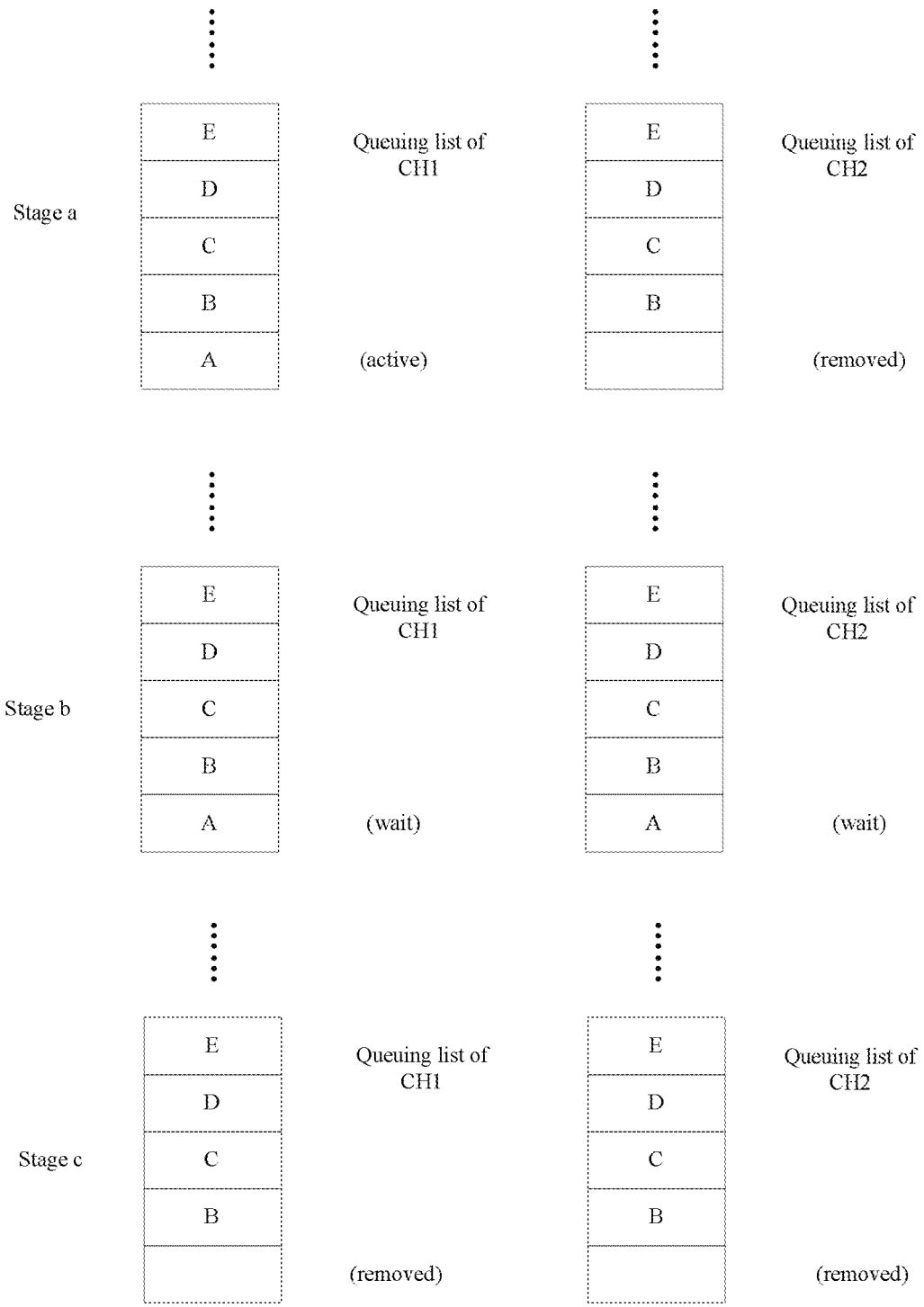
FIG. 6 is a diagram of queuing lists in the method as shown in FIG. 5.

Referring to FIG. 5 and FIG. 6, FIG. 5 is a flow chart of a data frame retransmission method according to an embodiment, and FIG. 6 is a diagram of queuing lists in the method as shown in FIG. 5. In the embodiment as shown in FIG. 5 and FIG. 6, the multi-link Wi-Fi system includes a first link and a second link, and FIG. 6 illustrates the queuing lists of the first link CH1 and the second link CH2.

In S21, when a first link obtains a transmission opportunity, a first data frame at a head of a queuing list of a first link is transmitted on the first link.

As shown in FIG. 6, at stage a, when the first link obtains a transmission opportunity, the STA or the AP transmits the first data frame at the head of the queuing list, i.e., the data frame A, on the first link. In some embodiments, after the first link obtains the transmission opportunity, the data frame A in the queuing list of the first link enters an active state and starts to be transmitted.

In some embodiments, the data frame retransmission method further includes: if a predetermined condition is not met, after the first data frame starts to be transmitted, removing the first data frame from at least one queuing list of at least one link other than the link on which the first data frame is being transmitted. Therefore, in the embodiment as shown in FIG. 6, after the data frame A in the queuing list of the first link enters the active state, the data frame A in the queuing list of the second link is removed.

In some embodiments, the data frame retransmission method further includes: if the predetermined condition is met, after transmission of the first data frame is completed, removing the first data frame from at least one queuing list of at least one link other than the link on which the first data frame is being transmitted.

It should be noted that when the second link obtains a transmission opportunity, the STA or the AP transmits on the second link a data frame at a head of the queuing list of the second link. Specifically, after the data frame A starts to be transmitted, if the second link obtains a transmission opportunity, the data frame B is transmitted on the second link.

In S22, if transmission of the first data frame does not succeed, the first data frame is ranked at the head of the queuing list of the first link, and if the predetermined condition is further met, the first data frame is duplicated to at least one other link in a retransmission link set, and ranked at at least one head of at least one queuing list of the at least one other link.

In some embodiments, the retransmission link set includes the first link and at least one link other than the first link, or includes the first link and a portion of the at least one link other than the first link, and the predetermined condition is related to a retransmission duration of the first data frame or window occupancy of a buffer.

In some embodiments, if the predetermined condition is not met, the data frame A merely can be retransmitted on the first link. If the predetermined condition is met, the data frame A is duplicated to the at least one other link in the retransmission link set, and ranked at the at least one head of the at least one queuing list of the at least one other link.

The predetermined condition is that accelerated processing by the system is required, and is related to a retransmission duration of the first data frame or window occupancy of a buffer. Details of the predetermined condition are not limited in embodiments of the present disclosure.

In some embodiments, the predetermined condition may be that the retransmission duration of the first data frame exceeds a retransmission time threshold. For example, in some real-time applications, the retransmission time threshold may be 5 ms. If the retransmission duration of the data frame A on the first link exceeds 5 ms, the data frame A may be duplicated to the at least one queuing list of the at least one other link.

In some embodiments, the predetermined condition may be that the window occupancy of the buffer exceeds an occupancy threshold. When transmission of the data frame A does not succeed, other subsequent data frames may be transmitted to the STA or the AP, and stored in its buffer. For example, buffer capacity of the STA is 64 data frames, and the occupancy threshold may be set to 48 data frames. When the number of data frames in the buffer exceeds 48, the data frame A may be duplicated to the at least one queuing list of the at least one other link.

In the embodiment as shown in FIG. 6, the retransmission link set includes the first link and the second link. At stage b, when transmission of the data frame A does not succeed, the data frame A is duplicated to the second link. At this time, the data frame A is in a wait state in both the queuing list of the first link and the queuing list of the second link, and is at the heads of both the queuing lists.

In S23, if any link in the retransmission link set obtains a new transmission opportunity, the first data frame is retransmitted on the link.

In the embodiment as shown in FIG. 6, when the first link or the second link obtains a new transmission opportunity, the data frame A enters the active state again, and starts to be transmitted on the first link or the second link.

In the embodiment as shown in FIG. 6, when the data frame A starts to be transmitted, the data frame A is not removed from the at least one queuing list of the at least one other link, that is, the queuing list of the second link.

In some embodiments, if the predetermined condition is met, after the first data frame starts to be transmitted, the first data frame enters a masked state in at least one queuing list of at least one link other than the link on which the first data frame is being transmitted. For example, after the data frame A starts to be transmitted on the first link, the data frame A enters a masked state on the second link. If the second link obtains a transmission opportunity at this time, the data frame B is transmitted on the second link.

In some embodiments, if the predetermined condition is met, after the first data frame starts to be transmitted, the first data frame enters a wait state in at least one queuing list of at least one link other than the link on which the first data frame is being transmitted. For example, after the data frame A starts to be transmitted on the first link, the data frame A enters a wait state on the second link. If the second link obtains a transmission opportunity at this time, the data frame A is also transmitted on the second link, which may increase possibility of successful transmission of data frames.

As shown in FIG. 6, at stage c, if the predetermined condition is met, after transmission of the data frame A is completed on the first link, the data frame A is removed from the queuing list of the second link.

In some embodiments, for each of the links in the retransmission link set, a transmission rate of the first data frame in retransmission is not higher than a transmission rate in a previous transmission.

In some embodiments, rate adjustment mechanisms during a data frame retransmission process may be the same or different for each link, and are independent for each ink. Specifically, the retransmission of the data frame A on one link does not affect the rate adjustment mechanism for retransmission of the data frame A on other links. For example, if the data frame is retransmitted for the first and third times on the second link, and is retransmitted for the second time on the first link, a first retransmission rate in the rate adjustment mechanism of the first link is applied for the second retransmission of the data frame A on the first link, and a second retransmission rate in the rate adjustment mechanism of the second link is applied for the third retransmission of the data frame A on the second link.

In some embodiments, after N times of failures in retransmission of the first data frame, the transmission of the first data frame is abandoned, where N is a positive integer. In some embodiments, N may be 10.

In the above embodiments, data frame duplication is combined with single link retransmission, which improves a data frame retransmission rate.

Figure 7:
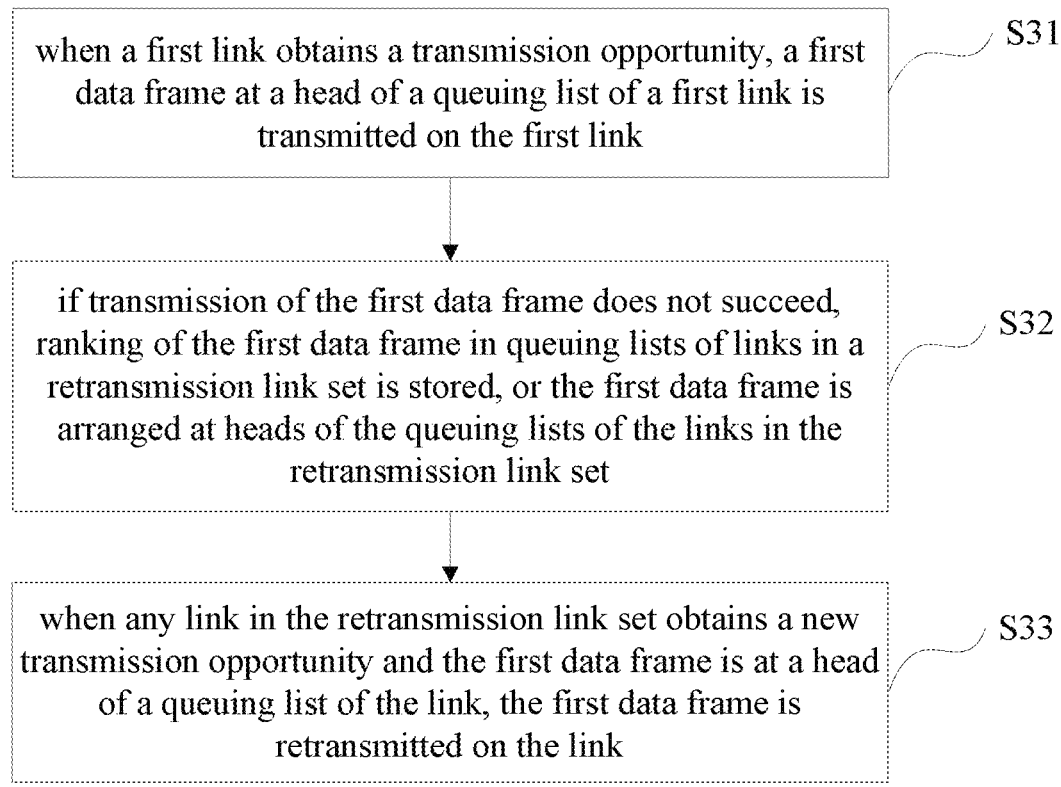
FIG. 7 is a flow chart of a data frame retransmission method according to an embodiment.
Figure 8:
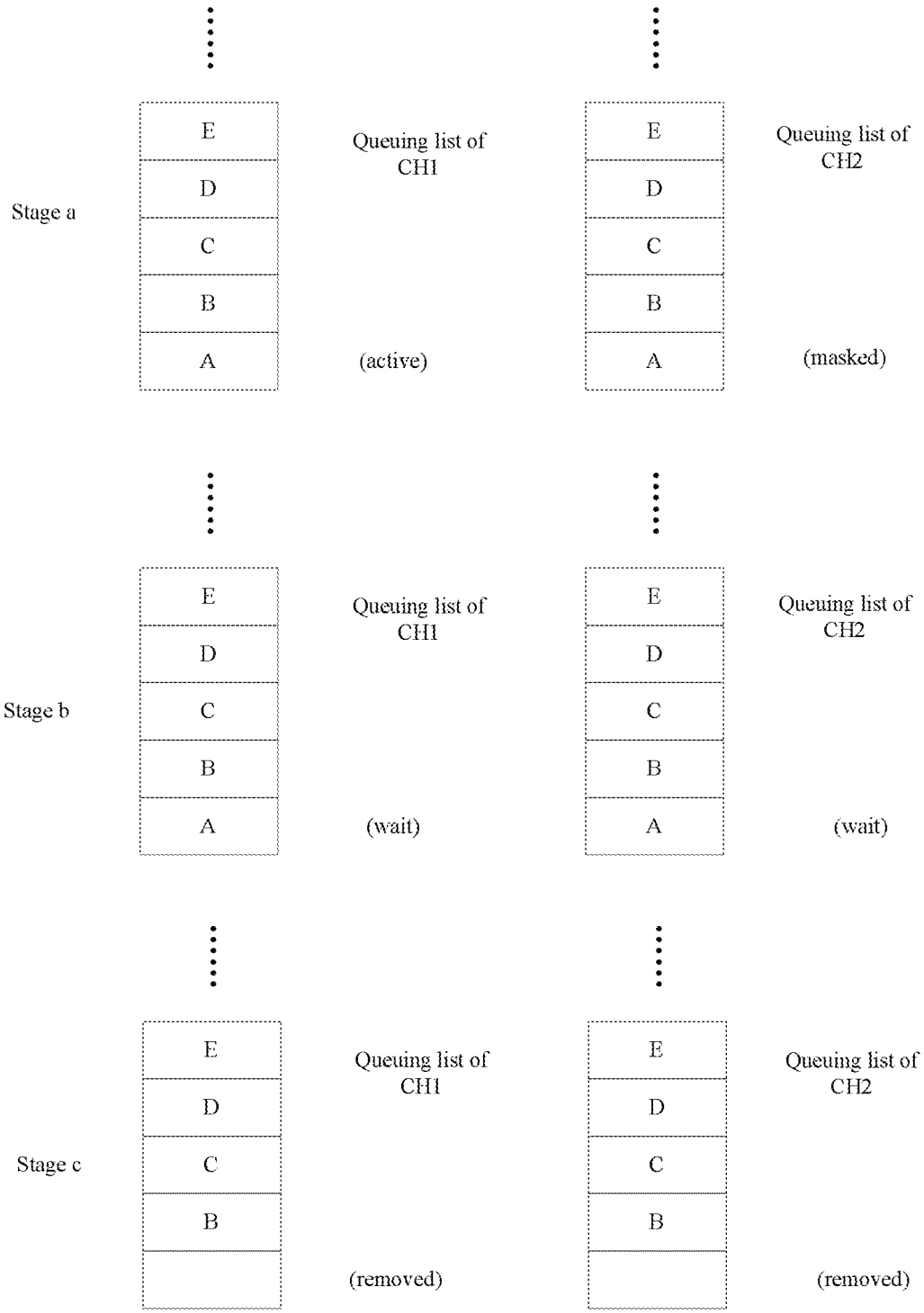
FIG. 8 is a diagram of queuing lists in the method as shown in FIG. 7.

Referring to FIG. 7 and FIG. 8, FIG. 7 is a flow chart of a data frame retransmission method according to an embodiment, and FIG. 8 is a diagram of queuing lists in the method as shown in FIG. 7. In the embodiment as shown in FIG. 7 and FIG. 8, the multi-link Wi-Fi system includes a first link and a second link, and FIG. 8 illustrates the queuing lists of the first link CH1 and the second link CH2.

In S31, when a first link obtains a transmission opportunity, a first data frame at a head of a queuing list of a first link is transmitted on the first link.

As shown in FIG. 8, at stage a, when the first link obtains a transmission opportunity, the STA or the AP transmits the first data frame at the head of the queuing list, i.e., the data frame A, on the first link. In some embodiments, after the first link obtains the transmission opportunity, the data frame A in the queuing list of the first link enters an active state and starts to be transmitted.

In some embodiments, after the first data frame starts to be transmitted, the first data frame enters a masked state in at least one queuing list of at least one link other than the link on which the first data frame is being transmitted.

For example, in the embodiment as shown in FIG. 8, after the data frame A in the queuing list of the first link enters the active state, the data frame A in the queuing list of the second link enters a masked state.

It should be noted that when the second link obtains a transmission opportunity, the STA or the AP transmits on the second link a data frame that is at the head of the queuing list and in a non-masked state. Specifically, after the data frame A starts to be transmitted, the data frame A in the queuing list of the second link enters a masked state, and if the second link obtains a transmission opportunity at this time, the data frame B is transmitted on the second link.

In S32, if transmission of the first data frame does not succeed, ranking of the first data frame in queuing lists of links in a retransmission link set is stored, or the first data frame is arranged at heads of the queuing lists of the links in the retransmission link set.

In some embodiments, the retransmission link set includes the first link and at least one link other than the first link, or includes the first link and a portion of the at least one link other than the first link.

In the embodiment as shown in FIG. 8, the retransmission link set includes the first link and the second link. At stage b, when transmission of the data frame A does not succeed, the ranking of the data frame A is restored in the queuing list of the second link. Therefore, the data frame A becomes a wait state in both the queuing list of the first link and the queuing list of the second link, and is at the heads of both the queuing lists.

In some embodiments, when the data frame A is transmitted on the first link, the data frame A may not be ranked at the at least one head of the at least one queuing list of the at least one other link in the retransmission link set. If transmission of the first data frame does not succeed, the first data frame may be arranged at the at least one head of the at least one queuing list of the at least one link in the retransmission link set.

In S33, when any link in the retransmission link set obtains a new transmission opportunity and the first data frame is at a head of a queuing list of the link, the first data frame is retransmitted on the link.

In the embodiment as shown in FIG. 8, when the first link or the second link obtains a new transmission opportunity and the data frame A is at a head of a queuing list of the first or second link, the data frame A enters the active state again, and starts to be transmitted on the first link or the second link.

In some embodiments, the data frame retransmission method further includes: after transmission of the first data frame is completed, removing the first data frame from at least one queuing list of at least one link other than the link on which the first data frame is being transmitted.

As shown in FIG. 8, at stage c, after the transmission of the data frame A is completed on the first link, the data frame A is removed from the queuing list of the first link. The data frame retransmission method further includes: after the transmission of the first data frame is completed, removing the first data frame from at least one queuing list of at least one link other than the link on which the first data frame is being transmitted. That is, only after the transmission of the data frame A is completed on one link in the retransmission link set, the data frame A may be removed from the at least one queuing list of the at least one other link.

In some embodiments, for each of the links in the retransmission link set, a transmission rate of the first data frame in retransmission is not higher than a transmission rate in a previous transmission.

In some embodiments, rate adjustment mechanisms during a data frame retransmission process may be the same or different for each ink, and are independent for each ink.

In some embodiments, after N times of failures in retransmission of the first data frame, the transmission of the first data frame is abandoned, where N is a positive integer. In some embodiments, N may be 10.

In the above embodiments, the data frame can be retransmitted on multiple links, which may reduce latency and buffer overflow in the Wi-Fi system.

Figure 9:
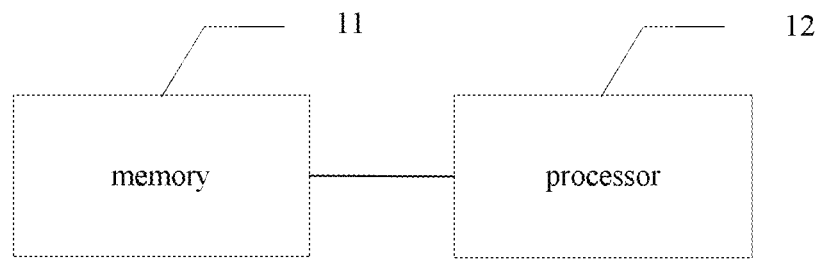
FIG. 9 is a structural diagram of a data frame retransmission device according to an embodiment.

FIG. 9 is a structural diagram of a data frame retransmission device according to an embodiment. The device may be applied in a STA or an AP. The device includes a memory 11 and a processor 12, where the memory 11 has a computer program stored therein which can be run on the processor 12 and is for implementing steps in the above data frame retransmission method, and when the processor 12 executes the computer program, the steps are performed. The memory 11 may include a Read Only Memory (ROM), a Random Access Memory (RAM), a magnetic disk or an optical disk. The data frame retransmission method includes: when a first link obtains a transmission opportunity, transmitting, on the first link, a first data frame at a head of the queuing list of the first link; if transmission of the first data frame does not succeed, ranking the first data frame at the head of the queuing list of the first link; and when the first link obtains a new transmission opportunity, retransmitting the first data frame on the first link.

Figure 10:
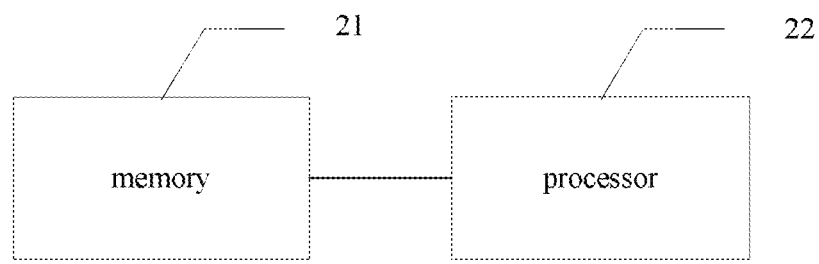
FIG. 10 is a structural diagram of a data frame retransmission device according to an embodiment.

FIG. 10 is a structural diagram of a data frame retransmission device according to an embodiment. The device may be applied in a STA or an AP. The device includes a memory 21 and a processor 22, where the memory 21 has a computer program stored therein which can be run on the processor 22 and is for implementing steps in the above data frame retransmission method, and when the processor 22 executes the computer program, the steps are performed. The memory 21 may include a ROM, a RAM, a magnetic disk or an optical disk. The data frame retransmission method includes: when a first link obtains a transmission opportunity, transmitting, on the first link, a first data frame at a head of the queuing list of the first link; if transmission of the first data frame does not succeed, ranking the first data frame at the head of the queuing list of the first link, and if a predetermined condition is further met, duplicating the first data frame to at least one other link in a retransmission link set, and ranking the first data frame at at least one head of at least one queuing list of the at least one other link; and if any link in the retransmission link set obtains a new transmission opportunity, retransmitting the first data frame on the link.

Figure 11:
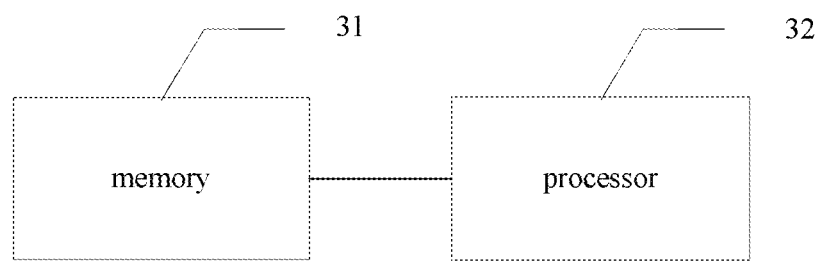
FIG. 11 is a structural diagram of a data frame retransmission device according to an embodiment.

FIG. 11 is a structural diagram of a data frame retransmission device according to an embodiment. The device may be applied in a STA or an AP. The device includes a memory 31 and a processor 32, where the memory 31 has a computer program stored therein which can be run on the processor 32 and is for implementing steps in the above data frame retransmission method, and when the processor 32 executes the computer program, the steps are performed. The memory 31 may include a ROM, a RAM, a magnetic disk or an optical disk. The data frame retransmission method includes: when a first link obtains a transmission opportunity, transmitting, on the first link, a first data frame at a head of the queuing list of the first link; if transmission of the first data frame does not succeed, restoring ranking of the first data frame in queuing lists of links in a retransmission link set, or arranging the first data frame at heads of the queuing lists of the links in the retransmission link set; and when any link in the retransmission link set obtains a new transmission opportunity and the first data frame is at a head of a queuing list of the link, retransmitting the first data frame on the link.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data frame retransmission method, wherein the method is applied to a transmitter in a multi-link Wi-Fi system which comprises a plurality of links, each of the plurality of links comprises a queuing list for determining a transmission order of data frames in the link, and the method comprises:
    transmitting, on a first link, a first data frame at a head of the queuing list of the first link, based on the transmitter obtaining a transmission opportunity at the first link;
    in response to a receiver failing to receive the first data frame, ranking the first data frame at the head of the queuing list of the first link;
    retransmitting the first data frame on the first link based on the transmitter obtaining a new transmission opportunity at the first link; and
    in response to the receiver receiving the first data frame, removing the first data frame from at least one queuing list of at least one link other than the first link, wherein the plurality of links comprise the first link and the at least one link.

2. The method according to claim 1, wherein a transmission rate in retransmission is not higher than a transmission rate in a previous transmission.

3. The method according to claim 1, wherein in response to the receiver failing to receive the first data frame for N times, the transmission of the first data frame is abandoned, where N is a positive integer.

4. A data frame retransmission device comprising a memory and a processor, wherein the memory has a computer program stored therein, and when the processor executes the computer program, the method according to claim 1 is performed.

5. A data frame retransmission method, wherein the method is applied to a transmitter in a multi-link Wi-Fi system which comprises a plurality of links, each of the plurality of links comprises a queuing list for determining a transmission order of data frames in the link, and the method comprises:
    transmitting, on a first link, a first data frame at a head of the queuing list of the first link, based on the transmitter obtaining a transmission opportunity at the first link;
    in response to a receiver failing to receive the first data frame, ranking the first data frame at the head of the queuing list of the first link, and duplicating the first data frame to at least one other link in a retransmission link set, and ranking the first data frame at least one head of at least one queuing list of the at least one other link, based on a predetermined condition being further met; and
    in response to the transmitter obtaining a new transmission opportunity at any link in the retransmission link set, retransmitting the first data frame on the link; and
    wherein the retransmission link set comprises the first link and at least one link other than the first link, or comprises the first link and a portion of the at least one link other than the first link, and the predetermined condition is that accelerated processing by the system is required.

6. The method according to claim 5, wherein the predetermined condition is related to a retransmission duration of the first data frame or window occupancy of a buffer.

7. The method according to claim 5, wherein for each of the links in the retransmission link set, a transmission rate in retransmission is not higher than a transmission rate in a previous transmission.

8. The method according to claim 7, wherein a rate adjustment mechanism during a data frame retransmission process is independent for each link.

9. The method according to claim 5, further comprising:
    in response to the first data frame being transmitted, removing the first data frame from at least one queuing list of at least one link other than the link on which the first data frame is being transmitted, based on the predetermined condition being not met.

10. The method according to claim 5, further comprising:
    in response to the first data frame being transmitted, enabling the first data frame to enter a masked state in at least one queuing list of at least one link other than the link on which the first data frame is being transmitted, based on the predetermined condition being met.

11. The method according to claim 5, further comprising:
    in response to the first data frame being transmitted, enabling the first data frame to enter a wait state in at least one queuing list of at least one link other than the link on which the first data frame is being transmitted, based on the predetermined condition being met.

12. The method according to claim 5, further comprising:
    in response to the receiver receiving the first data frame, removing the first data frame from at least one queuing list of at least one link other than the link on which the first data frame is being transmitted, based on the predetermined condition being met.

13. A data frame retransmission device comprising a memory and a processor, wherein the memory has a computer program stored therein, and when the processor executes the computer program, the method according to claim 5 is performed.

14. A data frame retransmission method, wherein the method is applied to a transmitter in a multi-link Wi-Fi system which comprises a plurality of links, each of the plurality of links comprises a queuing list for determining a transmission order of data frames in the link, and the method comprises:

transmitting, on a first link, a first data frame at a head of the queuing list of the first link, based on the transmitter obtaining a transmission opportunity at the first link;

in response to a receiver failing to receive the first data frame, restoring ranking of the first data frame in queuing lists of links in a retransmission link set, or arranging the first data frame at heads of the queuing lists of the links in the retransmission link set; and based on the transmitter obtaining a new transmission opportunity at any link in the retransmission link set and the first data frame being at a head of a queuing list of the link, retransmitting the first data frame on the link;

wherein the retransmission link set comprises the first link and at least one link other than the first link, or comprises the first link and a portion of the at least one link other than the first link.

15. The method according to claim 14, wherein for each of the links in the retransmission link set, a transmission rate in retransmission is not higher than a transmission rate in a previous transmission.

16. The method according to claim 15, wherein a rate adjustment mechanism during a data frame retransmission process is independent for each link.

17. The method according to claim 14, further comprising:

in response to the first data frame being transmitted, enabling the first data frame to enter a masked state in at least one queuing list of at least one link other than the link on which the first data frame is being transmitted.

18. The method according to claim 14, further comprising:

in response to the receiver receiving the first data frame, removing the first data frame from at least one queuing list of at least one link other than the link on which the first data frame is being transmitted.

19. A data frame retransmission device comprising a memory and a processor, wherein the memory has a computer program stored therein, and when the processor executes the computer program, the method according to claim 14 is performed.

* * * * *